United States Patent
Barroso

(10) Patent No.: US 9,779,058 B2
(45) Date of Patent: Oct. 3, 2017

(54) MODULATING PROCESSSOR CORE OPERATIONS

(71) Applicant: Google Inc., Mountain View, CA (US)

(72) Inventor: Luiz Andre Barroso, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 14/854,787

(22) Filed: Sep. 15, 2015

(65) Prior Publication Data

US 2017/0017611 A1    Jan. 19, 2017

Related U.S. Application Data

(60) Provisional application No. 62/191,763, filed on Jul. 13, 2015.

(51) Int. Cl.
| | | |
|---|---|---|
| *G06F 1/00* | (2006.01) | |
| *G06F 1/26* | (2006.01) | |
| *G06F 9/00* | (2006.01) | |
| *G06F 15/80* | (2006.01) | |
| *G06F 9/50* | (2006.01) | |

(52) U.S. Cl.
CPC ............ *G06F 15/80* (2013.01); *G06F 9/5061* (2013.01)

(58) Field of Classification Search
CPC .................................. G06F 15/80; G06F 1/26
See application file for complete search history.

(56) References Cited

U.S. PATENT DOCUMENTS

| | | | |
|---|---|---|---|
| 6,564,328 B1 * | 5/2003 | Grochowski | G06F 1/3203 712/E9.049 |
| 6,711,447 B1 | 3/2004 | Saeed | |
| 7,461,144 B1 * | 12/2008 | Beloussov | G06F 9/5055 707/999.202 |

(Continued)

FOREIGN PATENT DOCUMENTS

| | | |
|---|---|---|
| CN | 103037109 A | 4/2013 |
| WO | 2010/138031 | 12/2010 |

OTHER PUBLICATIONS

International Search Report and Written Opinion in International Application No. PCT/US2016/039803, dated Sep. 12, 2016, 10 pages.

(Continued)

*Primary Examiner* — Mark Connolly
(74) *Attorney, Agent, or Firm* — Fish & Richardson P.C.

(57) ABSTRACT

Methods, systems, and apparatus, including computer programs encoded on a computer storage medium, for reducing processor latency through the use of dedicated cores. In one aspect, a method includes a multi-core processor having n cores, including, selecting k cores of the n cores of the multi-core processor to perform dedicated low-latency operations for the n-core processor, where k is less than n, m cores are unselected, and each core of the multi-core processor has a rated core capacity. The methods operate the selected k cores at less than the rated core capacity such that k cores are collectively underutilized by an underutilized capacity and operate one or more of the m cores at a capacity in excess of the rated core capacity such that the m cores operate at a collective capacity that exceeds a collective capacity of the rated core capacities of the m cores.

20 Claims, 2 Drawing Sheets

(56) References Cited

U.S. PATENT DOCUMENTS

| | | | | |
|---|---|---|---|---|
| 8,595,731 B2 * | 11/2013 | Bose | ......................... | G06F 9/46 |
| | | | | 712/220 |
| 9,141,426 B2 * | 9/2015 | Bhandaru | ........... | G06F 11/3409 |
| 2008/0115010 A1 | 5/2008 | Rothman et al. | | |
| 2009/0328055 A1 * | 12/2009 | Bose | ..................... | G06F 1/3203 |
| | | | | 718/105 |
| 2014/0201542 A1 * | 7/2014 | Kommrusch | ............. | G06F 1/30 |
| | | | | 713/300 |
| 2014/0298060 A1 * | 10/2014 | Hooker | ................ | G06F 1/3293 |
| | | | | 713/323 |
| 2015/0113536 A1 | 4/2015 | Liu et al. | | |
| 2016/0231806 A1 * | 8/2016 | Gu | ........................ | G06F 1/3296 |

OTHER PUBLICATIONS

Liu, et al., 'Virtualization Polling Engine (VPE): Using Dedicated CPU Cores to Accelerate I/O Virtualization,' Jun. 2009, Yorktown Heights, NY, ACM, pp. 225-234, 10 pages.

Dorier, 'On the benefit of dedicating cores to mask I/O jitter in HPC simulations,' Performance, 2011, 40 pages.

\* cited by examiner

MODULATING PROCESSSOR CORE OPERATIONS

CROSS-REFERENCE TO RELATED APPLICATIONS

This application claims the benefit under 35 U.S.C. §119 (e) of U.S. Patent Application No. 62/191,763, entitled "MODULATING PROCESSOR CORE OPERATIONS," filed Jul. 13, 2015. The disclosure of the foregoing application is incorporated herein by reference in its entirety for all purposes.

BACKGROUND

This specification relates to techniques for modifying processor performance.

Modern computer processors typically include multiple independent processor cores. Current computing systems have been optimized for efficiently handling events that take multiple milliseconds (through operating system-supported multi-programming mechanisms such as process context switches) or tens of nanoseconds (through hardware processor features such as pre-fetching, out-of-order execution, predictions, etc.).

It remains a challenge to efficiently support events that take multiple microseconds, especially when low-latency response times are required. Such microsecond-granularity events are becoming more common with high-performance networking fabrics, new non-volatile storage technologies such as Flash and phase-change-memory, or data exchanges with computing accelerators such as Graphical Processing Units (GPUs). Microsecond level events are too short to afford the overhead of context switches and operating-system interrupts, and are too long to be easily addressed by hardware processor architectural features in today's microprocessors.

Dedicating processor cores to handle specific low-latency operations, which is sometimes referred to as spinning, is a possible solution to achieving low-latency in microsecond-granularity operations. However, dedicating a processor for specific I/O operation may subtract substantial computing power from a multi-core processor.

SUMMARY

In general, one innovative aspect of the subject matter described in this specification can be embodied in methods that include the actions implemented in a multi-core processor having n cores, including, selecting k cores of the n cores of the multi-core processor to perform dedicated low-latency operations for the n-core processor, where k is less than n, m cores are unselected, and each core of the multi-core processor has a rated core capacity. The methods operate the selected k cores at less than the rated core capacity such that k cores are collectively underutilized by an underutilized capacity and operate one or more of the m cores at a capacity in excess of the rated core capacity such that the m cores operate at a collective capacity that exceeds a collective capacity of the rated core capacities of the m cores.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The present systems and methods enable a particular number of independent processor cores of a multi-core processor to be dedicated to solely perform input/output (I/O) operations but at a reduced operating capacity, which, in turn, provides for additional operating capacity for the remaining cores of the multi-core processor. Dedicating processor cores for low-latency operations can achieve consistent low-latency for the multi-core processor, while reducing the negative effects of dedicating cores at full capacity for low-latency operations. By dedicating processor cores for low-latency operations at the reduced capacities, energy available from the underutilized dedicated processor cores can be used to increase the performance of the remaining cores in the multi-core processor.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The systems and methods described below relate to dedicating independent processor cores within a multi-core CPU (e.g., processor) to achieve low-latency and increase overall general operation processor core performance. In some implementations, a first set of processor cores of a multi-core processor are dedicated to performing low-latency operations. For example, low-latency operations can include input/output (I/O) operations, accessing data within memory (e.g., solid state drives, a flash devices, etc.) communicating with other processor cores, non-volatile storage technology such as a super computing style network fabric for exchanging very fast messages (e.g., 1 μS-100 μS), and other low-latency operations. A second set of processor cores in the multi-core processor are processor cores that are not restricted to only performing low-latency operations, e.g., the second set of processor cores may perform a multitude of different operations that are required of the processor. Typically, for an n-core processor, k cores are selected for the dedicated low-latency operations, and the remaining cores are selected for performing the remaining operations. However, the second set of cores need not necessarily include the remaining cores, e.g., for the n core processor, where n−k=m, the second set of cores may have a cardinality of m, or a cardinality that is less than m.

Typically, multi-core processors with processor cores that are dedicated to low-latency operations underutilize the dedicated low-latency processor cores leaving an unused amount of available energy. The multi-core processor can reduce the amount of power (e.g., voltage/frequency) utilized by the low-latency processor cores. The excess power capacity created by reducing the power consumption of the low latency processor cores can be added to the overall power capacity available to the remaining general purpose processor cores. Utilizing the additional power capacity available by the general purpose processor cores increases the performance of the remaining general purpose processor cores, which eliminates some of the stranded computational capacity.

The features and other features are described in more detail below.

Figure 1:
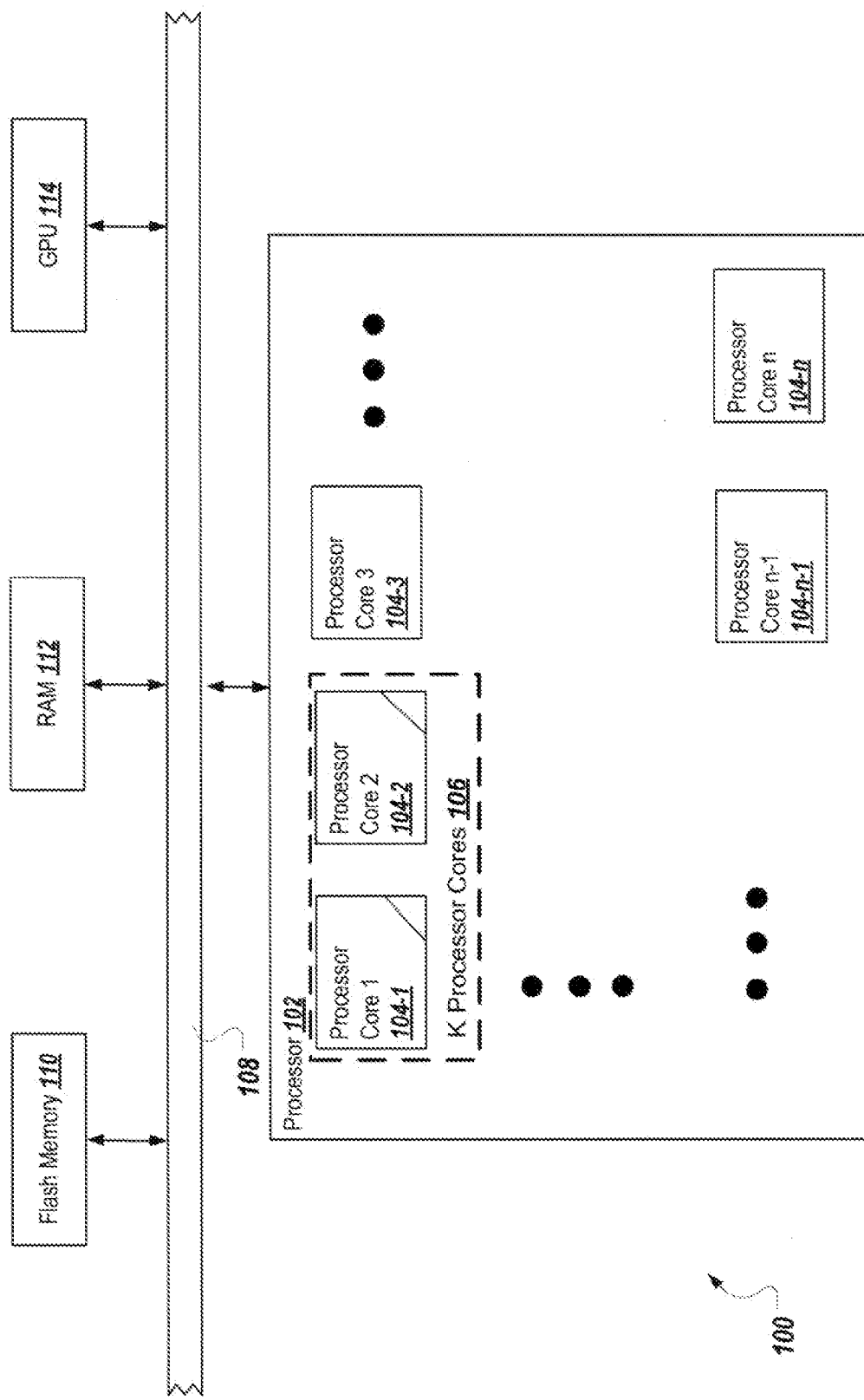
FIG. 1 is a block diagram of an environment in which a particular number of processor cores can be dedicated for low-latency operations, where each dedicated processing core is underutilized.

FIG. 1 is a block diagram of an environment 100 in which a particular number of processor cores can be dedicated for low-latency operations, where each dedicated processing core is underutilized. As shown, the environment 100 includes a multi-core processor 102 connected to a bus 108. The bus 108 communicatively couples the processor 102 to a set of external resources, including flash memory 110, random access memory (RAM) 112, and graphics processing unit (GPU) 114. The multi-core processor 102 includes processor cores 104-1-104-n (n cores) operable to execute instructions. The multi-core processor 102 also has a first set of k processor cores 106 which includes processor core 104-1 and processor core 104-2. While in the example of FIG. 1 the value of k is 2, other values of k can be utilized.

The multi-core processor 102 may be a single central processing unit (CPU) chip including multiple processor cores, storage resources, and other components. The multi-core processor 102 may also include firmware or microcode instructions stored in on-chip storage and operable to implement the techniques described herein. In some implementations, the instructions necessary to implement the techniques described herein may be implemented in silicon. The multi-core processor 102 may also include multiple processors, each processor including its own processor cores, storage resources, and/or other components.

The multi-core processor 102 is connected to the data bus 108. In some implementations, the data bus 108 may be a high-speed data transfer mechanism used to transmit data between components within the computing device chassis. The data bus 108 may be any type of bus capable of performing such data transfers.

A plurality of resources are connected to the data bus 108, including flash memory 110, RAM 112, and a GPU 114. In some implementations, additional resources may be connected to the data bus 108, including, but not limited to, Direct Memory Access (DMA) controllers, graphics cards, network cards, RAID controllers, and/or other resources.

As shown, the multi-core processor 102 includes processor cores 104-1-104-n. The processor cores 104-1-104-n can be separate components connected by a data bus or bridge to the other components of the multi-core processor 102. The multi-core processor 102 includes processor cores 104-1-104-n, where n is any suitable number of processor cores to conduct ordinary multi-core processor 102 functions.

Each processor core 104 in the multi-core processor 102 has a rated core capacity. The rated core capacity can be a measure of the maximum performance capacity (e.g., a highest voltage/frequency ratio that a processor core can achieve without causing damage to the processor core and maintain proper operation of the processor core) which describes how much power each processor core 104 can consume without damaging the processor core. The capacity can be measured in a variety of ways, such as by power consumption, maximum frequency, maximum frequency for a given voltage, maximum current, maximum operating temperature, or by any other measurement that is indicative of power consumption by the core.

In some implementations, the processor cores 104 may include other integrated components, such as, for example, dedicated cache memory such as L1 cache, hardware context storage, firmware storage, microcode storage, and/or other integrated components. The processor cores 104a-e can be assigned threads. In some implementations, the threads may be sets of instructions to be executed on the processor cores 104. For example, a thread may be a software application executing on the multi-core processor 102. The thread may also be one of many threads within a single software application that are executing on the multi-core processor 102.

The k processor cores 106 can be a particular number of processing cores that are dedicated solely to low-latency operations. When dedicated solely to I/O operation, the k processor cores 106 are unavailable to the operating system scheduler for assignment of general purpose processing tasks and only execute instructions related to I/O (e.g., retrieve/send data from flash memory 110, retrieve/send data from RAM 112, retrieve/send data from the GPU 114, etc.). In some implementations, the low-latency operations are microsecond low-latency operations, which is a measure of the speed of each operation. In other implementations, the low-latency operations may performed by the dedicated cores may include nanosecond and microsecond operations. As shown in FIG. 1, the k processor cores 106 include two processor cores 106-1 and 106-2. In some implementations, the k processor cores 106 can include any suitable number of processor cores, but less than the total number of processing cores to ensure proper operations of the processor 102, i.e., k<n.

The k processor cores 106 reduce latency for the processor 102 by reducing response time of the multi-core processor 102 for low-latency operations. The response time for the multi-core processor 102 is reduced by running low-latency operations in the k cores, which eliminates the need to pause other threads in the remaining m cores so that low-latency operations can be executed by the other cores.

The k processor cores 106 are not utilized to full capacity due to high utilization leading to a temporary build-up of processing queues which will increase latency for the processor 102. The remaining processor cores 104-k-104-n (e.g., the m cores) are dedicated to general purpose processing tasks. Typically, the number m of remaining processor cores 104-k-104-n is equal to the total number of processing cores minus the k processor cores 106. For example, in an n-core processor, n cores is equal to m cores plus k cores.

To reduce wear of the processing cores, the processor 102 may periodically rotate selections of the k cores (e.g., dedicated low-latency processor cores) in the multi-core processor. Rotation of the k cores ensures that over a period of time, each core is underutilized for the same period of time as the other cores, which promotes even wear among the processing cores.

As previously described, each of the k processor cores 106 serving as dedicated low-latency processor cores is underutilized. Each core in the multi-core processor has a rated core capacity. Typically, the rated core capacity is the same for each core.

Each of the k processor core's power consumption is at less than full rated core capacity. The remaining excess power capacity from the k processor cores 106 is used by the m cores to increase the performance of the m cores. Our solution relies on the fact that modern multi-core CPUs are built such that not all cores can be running at their maximum performance simultaneously (see the dark silicon reference earlier), as doing so would demand more energy than the CPU package is able to dissipate in heat while remaining within operating temperature ranges. Therefore a CPU can let a subset of its cores run at their maximum performance (highest frequency/voltage settings) only if the remaining CPUs are less active, therefore generating less heat and running possibly at lower frequency/voltage settings.

The underutilization of the k cores can take into account the amount of silicon that can be powered-on at the nominal operating voltage for a given thermal design power (TDP) constraint. The resulting commensurate reduction of general purpose computation capability is less than k/n, which reduces the negative effects of dedicated cores for low-latency operations to achieve relatively low latency for microsecond-level I/O operations.

Figure 2:
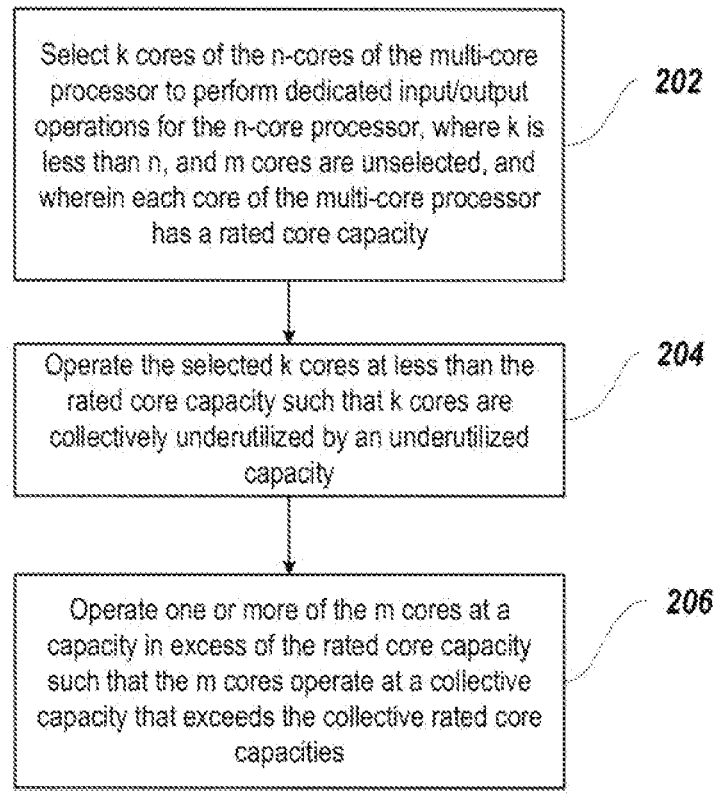
FIG. 2 is a flow diagram of an example process for increasing the performance of general operation processor cores by using excess energy from underutilized processor cores.

FIG. 2 is a flow diagram of an example process for increasing the performance of general operation processor cores using excess energy as a result of underutilized processor cores.

The process can be implemented in a multi-core processor having n cores. The multi-core processor 102 has an energy rating/capacity of n*E, where n is the number of cores and E is the rated core capacity per one core.

The process selects k cores of the n-cores of the multi-core processor 102 to perform dedicated input/output operations for the n-core processor 102, where k is less than n, and m cores are unselected, and wherein each core of the multi-core processor has a rated core capacity (202). The rated core capacity is a technical limitation (e.g., thermal design power, clock speed, power consumption, etc.) within which the processing cores 104 operate without sustaining damage. For example, the rated core capacity can be a rated core operational frequency, a rated core power consumption, a rated core operational temperature, or a ratio of the amount of voltage the processing core utilizes per clock speed (i.e., frequency).

In some implementations, the rated core capacity is equal to the maximum performance level (e.g., a highest voltage/frequency ratio that a processor core can achieve without causing damage to the processor core and maintain proper operation of the processor core) of the processing cores 104. Note also that a core can operate in excess of its rated capacity for a certain period of time without sustaining damage.

Furthermore, an n-core processor may have a processor rated capacity. The rated capacity of the processor may be equal to the sum of the rated core capacities, e.g., n*E. However, for some processors, the rate processor capacity may be less than the sum of the rated core capacities. This is due to the dark silicon effect, which defines an amount of silicon that cannot be powered-on at the nominal operating voltage for a given thermal design power (TDP) constraint.

The process operates the selected k cores at less than the rated core capacity such that k cores are collectively under-utilized by an underutilized capacity (204). As previously described, the k cores operate at z capacity and the underutilized capacity (u) can be calculated according to equation (1) below:

$$u = (100\% \text{ capacity} - z \text{ capacity}) \tag{1}$$

The underutilized capacity provides additional power availability to the multi-core processor 102. For the reasons set forth above, not all of the underutilized capacity may be available for the processor.

The process operates one or more of the m cores at a capacity in excess of the rated core capacity such that the m cores operate at a collective capacity that exceeds the collective rated core capacities of the m cores (206). In some implementations, the processor 102 may select less than all of the remaining cores to operate at a capacity in excess of the rated core capacity, but still operating at a capacity that is higher than the sum of all the remaining processor cores. The one or more of the m cores may operate at or up to an energy rating/capacity described by equation (2) below:

$$m \text{ core power usage} = [(n-k)+(u)*k]*E \tag{2}$$

In some implementations, operating one or more of the m cores at a capacity in excess of the rated core capacity includes operating the one or more of the m cores at a capacity that temporarily exceeds the sum of m rated core capacities and the underutilized capacity. The one or more processor cores may temporarily exceed the rated core capacity individually or collectively.

In other implementations, operating one or more of the m cores at a capacity in excess of the rated core capacity includes operating the one or more of the m cores at a capacity that does not exceed the sum of m rated core capacities and the underutilized capacity. The m rated cores may be operated at a capacity that is only in excess of the underutilized capacity of the k cores, which can be less than or equal to a rated processor capacity. For example, operating one or more of the m cores at a capacity in excess of the rated core capacity includes operating the one or more of the m cores at capacities such that the sum of the capacities at which the m cores are operating and the sum of the capacities at which the k cores are operating does not exceed the processor rated capacity.

Similar to the rated core capacity, the rated processor capacity can be described as a technical limitation within which the processor operates without sustaining damage, yet operating at an optimal performance level (e.g., the voltage/frequency ratio that yields the fast performance without consuming too much power). The processor rated capacity can be defined as less than the sum of the rated core capacities of the n cores.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a multi-core processor having n cores, comprising:
    selecting k cores of the n cores of the multi-core processor to perform dedicated low-latency operations for the n-core processor, wherein:
        k is less than n;
        m cores are unselected; and
        each core of the multi-core processor has a rated core capacity;
    operating the selected k cores at less than the rated core capacity such that k cores are collectively underutilized by an underutilized capacity; and
    operating one or more of the m cores at a capacity in excess of the rated core capacity such that the m cores operate at a collective capacity that exceeds a collective capacity of the rated core capacities of the m cores, and wherein selections of the k cores in the multi-core processor are periodically rotated such that at each selection a different set of k cores are selected.

2. The method of claim 1, wherein operating one or more of the m cores at a capacity in excess of the rated core capacity comprises operating the one or more of the m cores at a capacity that does not exceed a sum of m rated core capacities and the underutilized capacity.

3. The method of claim 1, wherein operating one or more of the m cores at a capacity in excess of the rated core capacity comprises operating the one or more of the m cores at a capacity that temporarily exceeds a sum of m rated core capacities and the underutilized capacity.

4. The method of claim 1, wherein:
    the multi-core processor has a processor rated capacity; and
    operating one or more of the m cores at a capacity in excess of the rated core capacity comprises operating the one or more of the m cores at capacities such that a sum of the capacities at which the m cores are operating and a sum of the capacities at which the k cores are operating does not exceed the processor rated capacity.

5. The method of claim 1, wherein the rated core capacity is a rated core operational frequency.

6. The method of claim 1, wherein the rated core capacity is a rated core power consumption.

7. The method of claim 1, wherein k+m is equal to n.

8. The method of claim 1, wherein the dedicated low-latency operations include at least one of memory accessing operations, I/O operations, and inter-processor communication.

9. A method implemented in a multi-core processor having n cores, comprising:
    selecting k cores of the n cores of the multi-core processor to perform dedicated low-latency operations for the n-core processor, wherein:
        k is less than n;
        m cores are unselected;
        each core of the multi-core processor has a rated core capacity; and
        the multi-core processor has a processor rated capacity, wherein the processor rated capacity is less than a sum of the rated core capacities of the n cores;
    operating the selected k cores at less than the rated core capacity such that k cores are collectively underutilized by an underutilized capacity;
    operating one or more of the m cores at a capacity in excess of the rated core capacity such that the m cores operate at a collective capacity that exceeds a collective capacity of the rated core capacities of the m cores; and
    operating one or more of the m cores at a capacity in excess of the rated core capacity comprises operating the one or more of the m cores at capacities such that a sum of the capacities at which the m cores are operating and a sum of the capacities at which the k cores are operating does not exceed the processor rated capacity.

10. A method implemented in a multi-core processor having n cores, comprising:
    selecting k cores of the n cores of the multi-core processor to perform dedicated low-latency operations for the n-core processor, wherein:
        k is less than n;
        m cores are unselected; and
        each core of the multi-core processor has a rated core capacity, wherein the rated core capacity is a rated core operational temperature;
    operating the selected k cores at less than the rated core capacity such that k cores are collectively underutilized by an underutilized capacity; and
    operating one or more of the m cores at a capacity in excess of the rated core capacity such that the m cores operate at a collective capacity that exceeds a collective capacity of the rated core capacities of the m cores.

11. A non-transitory storage medium in data communication with a multi-core processor having n cores and storing instructions that cause the multi-core processor to perform operations comprising:

selecting k cores of the n-cores of the multi-core processor to perform dedicated low-latency operations for the n-core processor, where k is less than n, and m cores are unselected, and wherein each core of the multi-core processor has a rated core capacity;

operating the selected k cores at less than the rated core capacity such that k cores are collectively underutilized by an underutilized capacity and periodically rotating selections of the k cores in the multi-core processor; and operating one or more of the m cores at a capacity in excess of the rated core capacity such that the m cores operate at a collective capacity that exceeds a collective capacity of the rated core capacities of the m cores.

12. The non-transitory storage medium of claim 11, wherein operating one or more of the m cores at a capacity in excess of the rated core capacity comprises operating the one or more of the m cores at a capacity that does not exceed a sum of m rated core capacities and the underutilized capacity.

13. The non-transitory storage medium of claim 11, wherein operating one or more of the m cores at a capacity in excess of the rated core capacity comprises operating the one or more of the m cores at a capacity that temporarily exceeds a sum of m rated core capacities and the underutilized capacity.

14. The non-transitory storage medium of claim 11, wherein:

the multi-core processor has a processor rated capacity; and operating one or more of the m cores at a capacity in excess of the rated core capacity comprises operating the one or more of the m cores at capacities such that a sum of the capacities at which the m cores are operating and a sum of the capacities at which the k cores are operating does not exceed the processor rated capacity.

15. The non-transitory storage medium of claim 11, wherein the rated core capacity is a rated core operational frequency.

16. The non-transitory storage medium of claim 11, wherein the rated core capacity is a rated core power consumption.

17. The non-transitory storage medium of claim 11, wherein k+m is equal to n.

18. The non-transitory storage medium of claim 11, wherein the dedicated low-latency operations include at least one of memory accessing operations, I/O operations, and inter-processor communication.

19. A non-transitory storage medium in data communication with a multi-core processor having n cores and storing instructions that cause the multi-core processor to perform operations comprising:

selecting k cores of the n-cores of the multi-core processor to perform dedicated low-latency operations for the n-core processor, where k is less than n, and m cores are unselected, and wherein each core of the multi-core processor has a rated core capacity, and the multi-core processor has a processor rated capacity, wherein the processor rated capacity is less than a sum of the rated core capacities of the n cores;

operating the selected k cores at less than the rated core capacity such that k cores are collectively underutilized by an underutilized capacity;

operating one or more of the m cores at a capacity in excess of the rated core capacity such that the m cores operate at a collective capacity that exceeds a collective capacity of the rated core capacities of the m cores; and operating one or more of the m cores at a capacity in excess of the rated core capacity comprises operating the one or more of the m cores at capacities such that a sum of the capacities at which the m cores are operating and a sum of the capacities at which the k cores are operating does not exceed the processor rated capacity.

20. A non-transitory storage medium in data communication with a multi-core processor having n cores and storing instructions that cause the multi-core processor to perform operations comprising:

selecting k cores of the n-cores of the multi-core processor to perform dedicated low-latency operations for the n-core processor, where k is less than n, and m cores are unselected, and wherein each core of the multi-core processor has a rated core capacity;

operating the selected k cores at less than the rated core capacity such that k cores are collectively underutilized by an underutilized capacity, wherein the rated core capacity is a rated core operational temperature; and operating one or more of the m cores at a capacity in excess of the rated core capacity such that the m cores operate at a collective capacity that exceeds a collective capacity of the rated core capacities of the m cores.

* * * * *